Dec. 19, 1922. 1,439,182
J. W. MARKELL.
HEN'S NEST
FILED JUNE 12, 1920. 2 SHEETS-SHEET 2
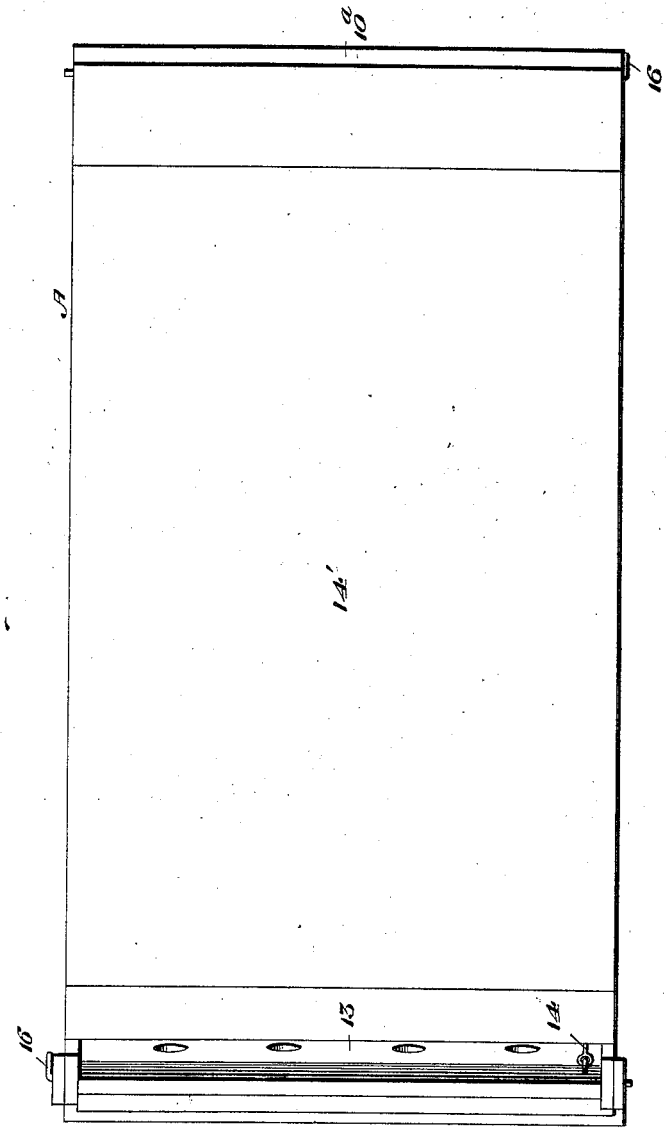

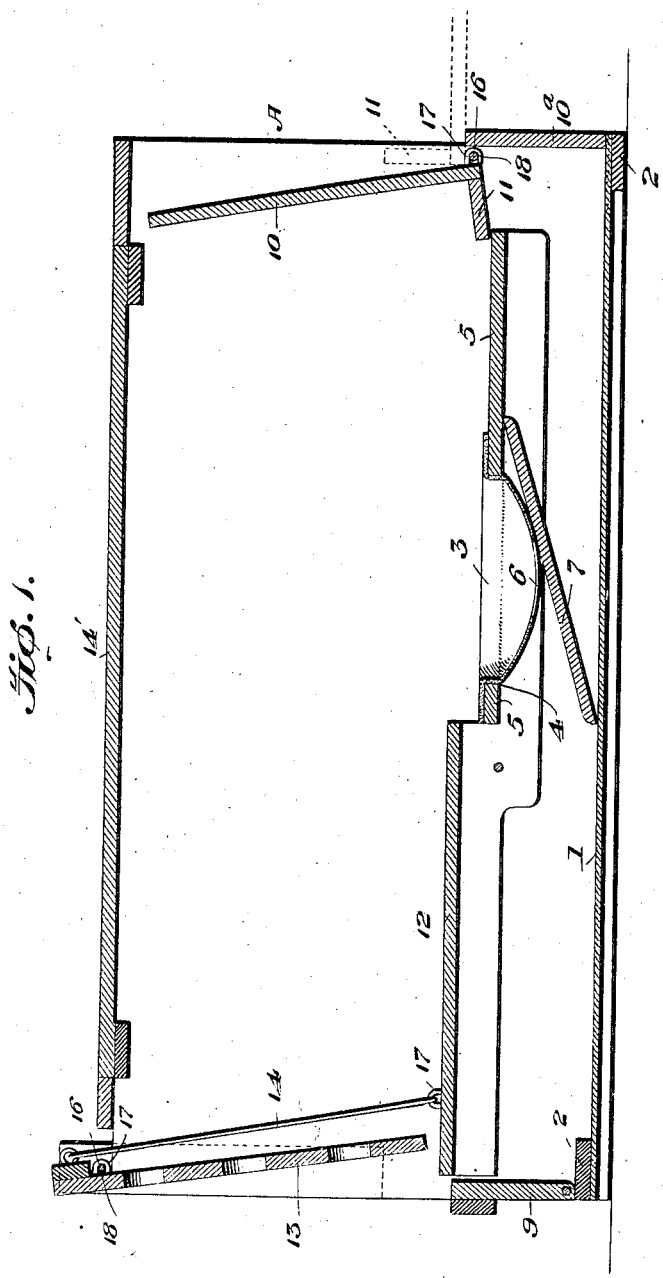

Patented Dec. 19, 1922.

1,439,182

UNITED STATES PATENT OFFICE.

JOHN W. MARKELL, OF SEATTLE, WASHINGTON.

HEN'S NEST.

Application filed June 12, 1920. Serial No. 388,499.

*To all whom it may concern:*

Be it known that I, JOHN W. MARKELL, a citizen of the United States, residing at Seattle, in the county of King and State of Washington, have invented certain new and useful Improvements in Hens' Nests, of which the following is a specification.

My invention relates to an improvement in hens' nests.

Its purpose is to protect the egg from being damaged either by breakage or being soiled, and the invention consists in an enclosure having a nest pivoted therein at a suitable distance above the bottom of the enclosure, with a hole in the bottom through which the egg drops out of the way, where it can be neither broken nor soiled, in connection with doors hinged at the end of the enclosure, the one at the entrance so constructed that the hen automatically closes it on entering, and the one at the opposite end constructed and adapted to be opened by the hen leaving the nest and stepping upon a platform connected therewith at the exit end where she is induced to go by following the light coming in at that end of the enclosure.

Other minor features are also included in the novel means employed in carrying out my invention in its most approved form, which will be more fully described and claimed hereinafter.

In the accompanying drawings:

Fig. 1 is a longitudinal sectional view through the nest;

Fig. 2 is a top plan view.

A, represents a box or closure having some soft fabric 1, such as cloth of any description stretched across the bottom to present a soft surface upon which to receive the eggs, the same being held in any approved manner, as for instance by the strips or cleats 2 which may be removably attached at the edges of the bottom.

A nest 3, preferably of some textile fabric, is secured in the hole 4 of the false bottom 5, and has a hole 6 at the center. This fabric constitutes the nest proper, and the hole 6 is an outlet for the egg, which finds its way therethrough by gravity to the floor 7 below, which slopes forwardly, really forming the bottom of the nest, and delivers the egg by gravity to the flexible bottom, giving it a tendency to roll to the forward end, where a door 9 is provided, which is opened for the removal of the egg or eggs.

A door 10, substantially L-shape in cross-section, is pivoted at the entrance, and when open lies horizontally and is supported on the end wall 10ª with the flange 11 extending upwardly. The hen on entering the nest, lights upon this door, and stepping on the flange 11 closes it, thus shutting herself in, the flange taking a position over the end of the false bottom which carries the nest. The opposite end of the false bottom has a platform 12 upon which the hen proceeds after leaving the nest, her attention being drawn to that end by the light which comes through the open work gravity trap-door 13, which is pivoted at that end, and which is connected by rod 14 to the platform. So the hen, as she walks forward toward this end, counter-balances the weight of the false bottom and platform which holds them in their normal position, which has the effect of simultaneously opening both doors 13 and 10, at the same time lifting the nest away from the egg, which may have still rested on the sloping floor, within the hole in the nest, but which in this way becomes released to gravitate to the flexible bottom below, where it is out of the way, and cannot be broken or soiled by other hens.

Each hen upon leaving the nest always leaves it ready for the next hen.

The doors 10 and 13 are preferably held in hinged position by the removable pins 16 extending through the eyelets 17 in the doors, and through the holes 18 in the sides of the box.

A cover 14′ at the top is removable so that an attendant can gain access to the nest any time it may be desired.

In this way, no harm ever comes to the egg, and a great saving is effected by reason thereof, as breakage is reduced to a negligible percentage, and the eggs are always clean and marketable.

Thus in a very simple way, an effective means is provided for preventing a large percentage of loss of eggs which hitherto has amounted to no inconsiderable number in the poultry business where it is conducted on a large scale.

I claim:

1. The combination with a box having open ends and doors pivoted thereto for closing said ends, of a pivoted nest which reaches from one door to the other and is constructed and adapted to simultaneously open both doors as the hen passes in one direction from the nest.

2. The combination with a box having open ends, doors therefor, a pivoted nest, one of said doors having a flange at its pivoted end which extends upwardly when the door is open, in position to be lowered upon an edge of the nest, by the weight of the hen thereby closing the door, the nest having a platform at one end which is connected to the adjacent door whereby the hen on leaving the nest in one direction causes the nest and platform to tilt, thereby simultaneously opening both of the doors, permitting her exit through one, after which the door automatically closes, leaving the other door open for the entrance of a hen at that end.

3. The combination with a box open at both ends, and having a flexible bottom, and provided with a sloping floor, of a nest pivoted within the box and having a hole directly over and above the sloping floor, which latter normally closes the hole, the nest having a platform at one end, doors hinged at each open end, one having a flange which rests directly over an end of the nest when closed, and the other door having openings to let light through, and having a connection with the platform, whereby when the hen leaves the nest in one direction her weight tilts the platform and nest to release the egg and allow it to gravitate upon the flexible bottom, and to simultaneously open the door at each end to permit the hen to leave at one end and to prepare the nest for a hen to enter at the opposite end, after which the nest and the exit door return by gravity to their normal positions.

In testimony whereof I affix my signature.

JOHN W. MARKELL.